United States Patent
Mukainakano

[11] Patent Number: 6,150,797
[45] Date of Patent: Nov. 21, 2000

[54] CHARGE AND DISCHARGE CONTROL CIRCUIT WITH FUNCTION DETECTING CHARGE AND DISCHARGE CURRENT AND CHARGEABLE POWER SUPPLY UNIT

[75] Inventor: Hiroshi Mukainakano, Chiba, Japan

[73] Assignee: Seiko Instruments Inc., Japan

[21] Appl. No.: 09/129,902

[22] Filed: Aug. 6, 1998

[30] Foreign Application Priority Data

Aug. 7, 1997 [JP] Japan ................................. 9-213739

[51] Int. Cl.$^7$ ............................................. H01M 10/46
[52] U.S. Cl. ........................................ 320/134; 320/136
[58] Field of Search ................................. 320/125, 127, 320/128, 132, 134, 136, 162, 163, 164

[56] References Cited

U.S. PATENT DOCUMENTS

| | | | |
|---|---|---|---|
| 5,534,788 | 7/1996 | Smith et al. | 324/771 |
| 5,557,188 | 9/1996 | Piercey | 320/134 |
| 5,619,115 | 4/1997 | Kajita | 320/166 |
| 5,621,300 | 4/1997 | Sato et al. | 320/101 |
| 5,659,238 | 8/1997 | Faulk et al. | 320/136 |
| 5,705,913 | 1/1998 | Takeuchi et al. | 320/134 |
| 5,883,495 | 3/1999 | Smith et al. | 320/134 X |

*Primary Examiner*—Edward H. Tso
*Attorney, Agent, or Firm*—Adams & Wilks

[57] ABSTRACT

A charge and discharge control circuit and a chargeable power supply unit incorporating the charge and discharge control circuit are provided with a current detecting element capable of detecting low currents with high accuracy and detecting high currents wuthout excessive power dissipation. The charge and discharge control circuit detects a charge and discharge state of a secondary cell and controls the charging and discharging of the secondary cell in accordance with the detected state. A switch circuit and the current detecting element are connected in series with the secondary cell. The current detecting element has an adjustable resistance value which is varied in accordance with the value of a current flowing therethrough, and comprises a first resistor and a second resistor connected in series, and a switch element connected in parallel to the second resistor. When current is low, the switch is operated so that current flows through the first and second resistors so that increased detection accuracy is possible. When is high, the switch is operated so that current flows only through the first resistor so that detection accuracy remains high but power dissipation is not increased.

20 Claims, 8 Drawing Sheets

CHARGE AND DISCHARGE CONTROL CIRCUIT WITH FUNCTION DETECTING CHARGE AND DISCHARGE CURRENT AND CHARGEABLE POWER SUPPLY UNIT

BACKGROUND OF THE INVENTION

The present invention relates to a charge and discharge control circuit for controlling for charge and discharge of a secondary cell by controlling the ON/OFF state of a switch circuit and having a function of detecting charge and discharge current, and a chargeable power supply unit using the circuit.

The circuit block diagram of the prior chargeable power supply unit comprising a secondary cell is shown in FIG. 2. A secondary cell 101 is connected to an external terminal 105 or 104 through a switch circuit 103 and a sensing resistance 128. One terminal of the sensing resistance 128 and the switch circuit 103 is connected to a sensing terminal 129. A charge and discharge control circuit 102 is connected to the secondary cell 101 in parallel. The charge and discharge control circuit 102 has a function of detecting a voltage of the secondary cell 102. A signal is output from the charge and discharge control circuit 102 so that the switch circuit 103 turns OFF in any of the following states of the secondary cell 101: an over-charge state in which the voltage of the secondary cell is higher than a predetermined voltage, hereafter, this state is called an "over-charge protection state"; and an over-discharge state in which the voltage of the secondary cell 101 is lower than a predetermined voltage, hereafter, this state is called an "over-discharge protection state". By stopping discharge when the voltage of the sensing terminal 129 or the external terminal 104 reaches a certain voltage, it is possible to limit current flowing through the switch circuit 103. That is, it is possible to stop discharge or to control over-current when excessive current flows, hereafter, this state is called an over-current protection state.

The chargeable power supply unit has a function of detecting charge current and discharge current to the secondary cell. Because the sensing terminal 129 is connected to the secondary cell 101 in series, the charge and discharge control circuit 102 can detect current by monitoring the voltage at the sensing terminal 129. As sensing charge and discharge current results in monitoring cell capacity of the secondary cell, representation of remaining cell capacity is realized.

A circuit block diagram of an another example of the chargeable power supply unit comprising the prior secondary cell is shown in FIG. 3. In the circuit, the sensing resistance 128 shown in FIG. 2 is connected to a positive polarity 110 of the secondary cell in series. The remaining construction and parts in the circuit operate entirely similar to the above-mentioned circuit.

However, the prior charge and discharge control circuit constructed in the above-mentioned manner has the following defects in the case of detecting low charge and discharge current.

While charging to the secondary cell 101, current flows to the sensing resistor 128 from a charger 108 through the secondary cell 101. At this time, voltage of the sensing terminal 129 is lower than the negative polarity 111 of the secondary cell 101. Alternatively, while discharging, current flows to a load 109 from the secondary cell 101 through the sensing resistor 128. Voltage of the sensing resistor 129 is higher than the negative polarity 111 of the secondary cell. That is, the sensing resistor 128 (Rsens) multiplied by charge and discharge current value appears at the sensing terminal 129. By monitoring and calculating the value, the remaining capacity of the secondary cell can be monitored.

Being connected to the secondary cell 101 in series, the sensing resistor 128 should be small in resistance. This is because current is wasted during charge and discharge of the secondary cell when the sensing resistor has a large value. The sensing resistor therefore has value of 10 to 50 mΩ.

However, when the sensing resistor has a small value, a problem occurs in the circuit. For example, assuming the following conditions: a discharge current of 100 mA; and a sensing resistor a 30 mΩ. At this time, the voltage at the sensing terminal 129 is only 3 mV. Although the voltage is generally amplified as voltage detected is low, it is difficult to measure correctly a voltage such as 3 mV because the offset voltage (Voffset) of the operational amplifier has a value of about 1 to 10 mV.

In order to calculate the remaining capacity of the secondary cell using a microcomputer, the voltage is applied to an A/D (Analog to Digital) converter. As a reference voltage of the A/D converter is generally about 3 V, the value of 3 mV must be amplified 400 times. Because of that, if the amplifier has Voffset, the output voltage includes an error. For example, the operational amplifier has an offset voltage of about 2 mV, the output includes an error of 0.8 V at 400 times multiple of input in the operational amplifier.

Although it is possible by using a technique such as trimming to reduce the offset voltage of an operational amplifier, the manufacturing process becomes extremely complex, and the product itself becomes expensive.

In order to solve the prior problem, an object of the present invention is to provide a configuration in which the resistance value of the sensing resistor is made large when charge and discharge current flowing through the secondary cell becomes small, and the resistance value of the sensing resistor is made small when the charge and discharge current flowing through the secondary cell becomes large. The terminal voltage of each sensing resistor at time is monitored by the operational amplifiers different from each other in amplification factor so as to receive no influence of offset voltage included in the operational amplifier. By this configuration, a charge and discharge control circuit is provided, which has a function of monitoring correctly charge and discharge current and which is high in performance, small in loss, and safe in use.

SUMMARY OF THE INVENTION

To solve the above-mentioned problems, a charge and discharge control circuit of the present invention has at least two sensing resistors. An operational amplifier different from each other in amplification factor is connected to one terminal of each sensing resistor. When charge and discharge current is less than the desired value, two sensing resistors are connected in series. When charge and discharge current is more than the desired value, resistance value of the second resistor becomes almost zero.

DETAILED DESCRIPTION OF THE INVENTION

In the above-mentioned charge and discharge control circuit and the chargeable power supply unit of the present invention, sensing resistor value varies in accordance with charge and discharge current. For large charge and discharge current, a small sensing resistance is selected so as to reduce loss of charge and discharge current. Voltage value is sufficient to detect even voltage fall of the sensing resistor, and the detecting accuracy is high because of the low amplification factor of the operational amplifier. In contrast, for small charge and discharge current, voltage value is sufficient to detect even voltage fall of the sensing resistor because of the high resistance value of the sensing resistor, and the detecting accuracy is high because of the low amplification factor of the operational amplifier at this time as well. That is, in any condition of charge and discharge current, a circuit easily realizing high detecting accuracy is provided because of small loss caused by the sensing resistor and low amplification factor of the operational amplifier. Charge and discharge current too can be monitored by connecting the operational amplifier in a chargeable power supply unit.

Referring to the attached figures, embodiments of the present invention will be described below.

Figure 1:
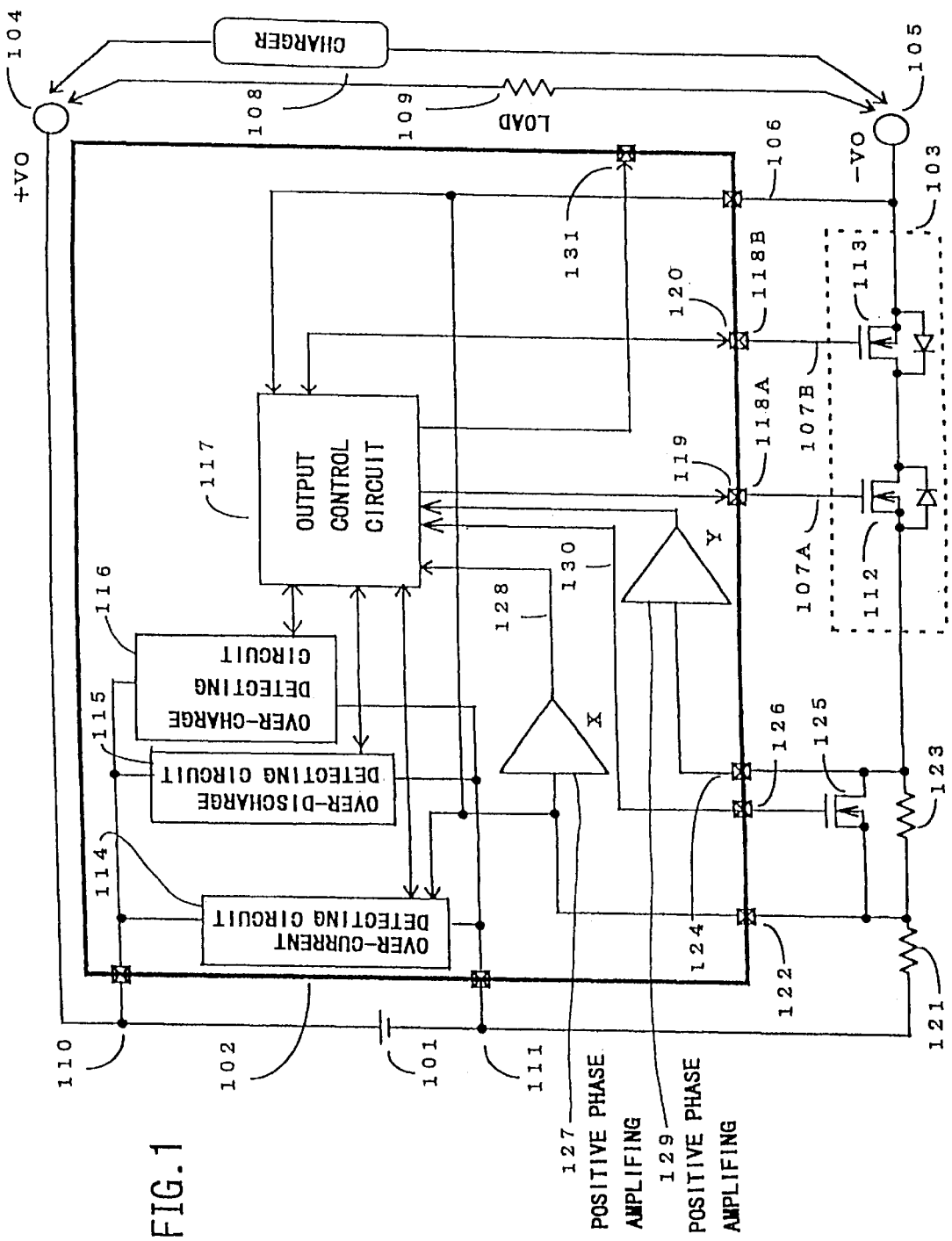
FIG. 1 is a circuit block diagram showing a first embodiment of a chargeable power supply unit of the present invention.
Figure 2:
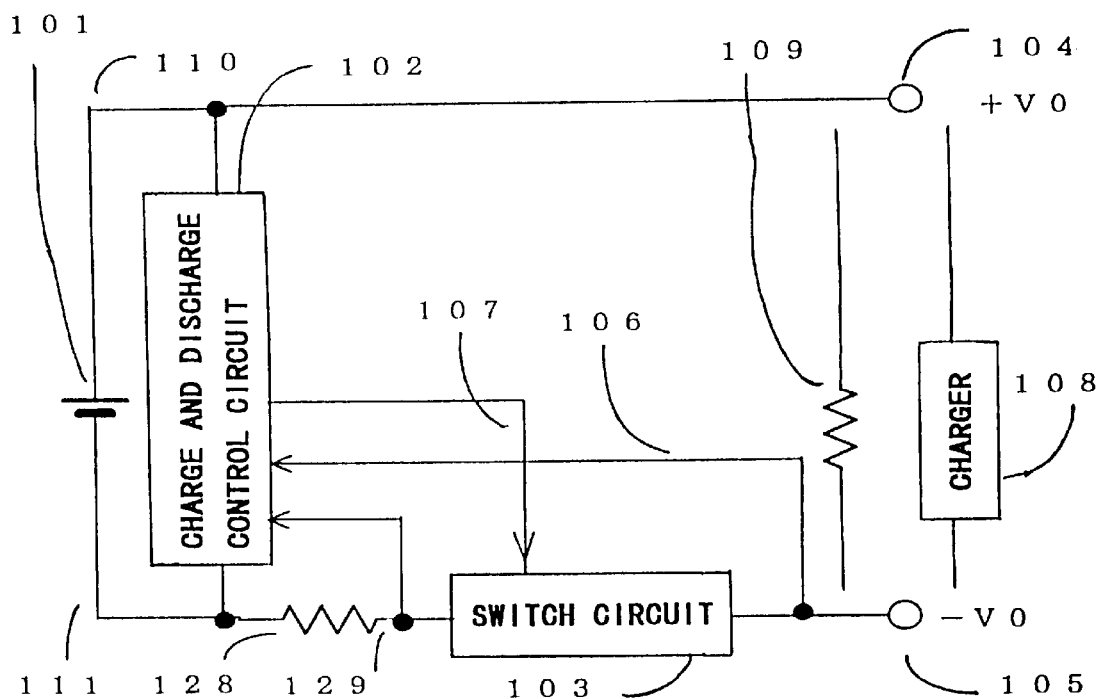
FIG. 2 is a circuit block diagram showing the prior chargeable power supply unit.
Figure 3:
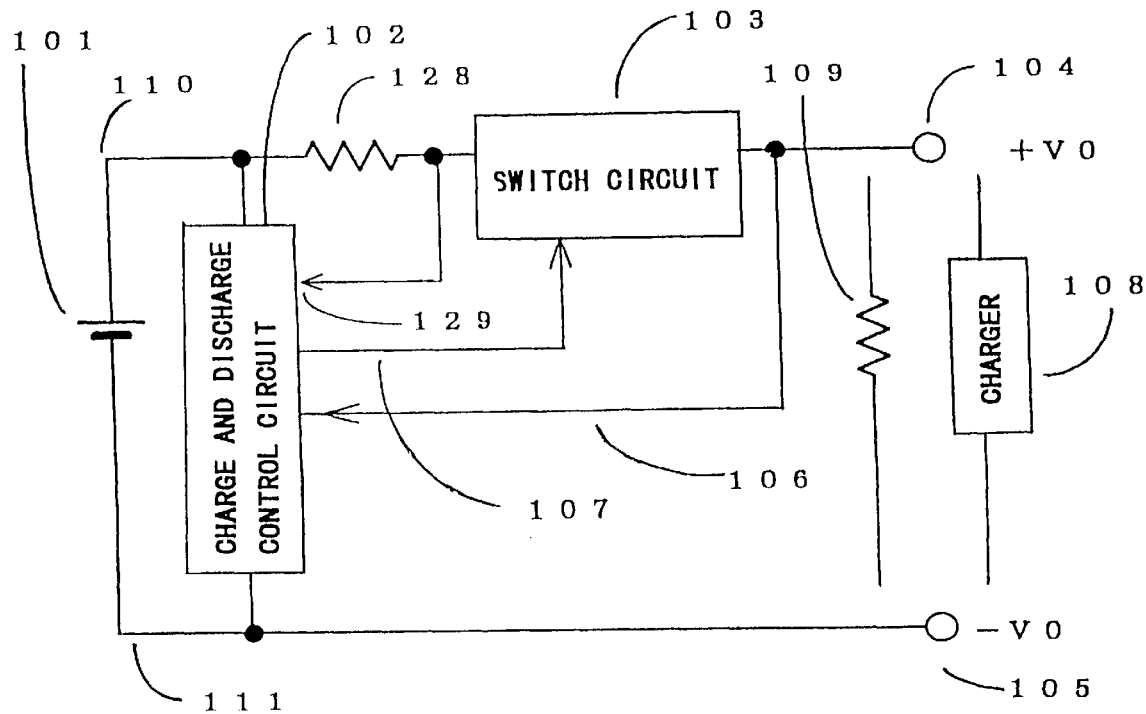
FIG. 3 is a circuit block diagram showing another example of the prior chargeable power supply unit.

FIG. 1 is a circuit block diagram showing a first embodiment of a chargeable power supply unit of the present invention. A secondary cell 101 is connected to an external terminal 105 through sensing resistors 121, 123 and a switch circuit 103. The switch circuit 103 comprises two N-ch FETs 112 and 113. Voltage of the secondary cell 101 is detected by a charge and discharge control circuit 102. The charge and discharge control circuit 102 comprises an over-charge detecting circuit 116, an over-discharge detecting circuit 115, an over-current detecting circuit 114, an output control circuit 117, and so on.

The over-charge detecting circuit 116 monitors voltage of the secondary cell 101, and may be constructed with any circuit having the desired function in which an output thereof is varied at a certain voltage. Generally, this function is realized by a combination of circuits including a reference voltage generating circuit, a comparator, a voltage dividing circuit and so on, and the like, as included in many kinds of products designed and manufactured.

The charge and discharge control circuit 102 is connected to the switch circuit 103 by signal lines 107A, 107B, and ON/OFF signal of the switch circuit 103 is sent. Two MOSFETs are used for the switch circuit 103 of the present invention. An FET 112 and an FET 113 are connected to the external terminal 105 in series. A charger for charging the secondary cell 101 and a device driven by the secondary cell (a load 109, as seen from the secondary cell) are connected between external terminals 104 and 105.

The over-charge detecting circuit 116 and the over-discharge detecting circuit 115 have a function of detecting the voltage of the secondary cell 101. According to the output of the over-charge detecting circuit 116 and the over-discharge detecting circuit 115, the output control circuit 117 sends signals to terminals 118A and 118B. Therefore, according to each state, the gate voltage of each of FETs 112 and 113 varies so as to control the charge and discharge to the secondary cell 101 in an ON/OFF manner. For example, in over-charge state, output of the over-charge detecting circuit 116 is inverted, the output control circuit 117 responds to the output, and the gate voltage of the FET 113 of the switch circuit changes from HIGH to LOW. Because of that, charge current from the charger 108 does not flow to the secondary cell 101 so that charge stops.

Similarly in an over-discharge state, according to the output of over-discharge detecting circuit 115, discharge stops when the gate voltage of the FET 112 of the switch circuit changes from HIGH to LOW.

The over-current detecting circuit 114 monitors the voltage at the external terminal 105 and sensing terminal 122, outputs signals according to each state, and supplies the output signal to the output control circuit 117. The output control circuit 117 sends signals to the FET 112 so as to stop discharge from the secondary cell 101 in an over-current protection state.

Although it is possible to realize a switch with one FET instead of the above-mentioned switch with two FETs, it is necessary to change the substrate voltage with the gate voltage of the FET for this purpose. If this is not done, the FET does not normally operate because the state in which the source voltage of the FET is higher than the drain voltage thereof. Because of that, it is impossible to control the charge and discharge in the above-mentioned manner. Control with two FETs is common recently.

The present embodiment has a function of monitoring charge and discharge current from the secondary cell 101. One terminal of the sensing resistance 121 is connected to the negative pole of the secondary cell 101, the other terminal is connected to the sensing terminal 122. During charging of the secondary cell 101, current flows from the charger 108 to the sensing resistor 121 through the secondary cell 101. In contrast during discharge of the cell 101, current flows from the secondary cell 101 to the load 109 and through the sensing resistance 121. At that time, the voltage of the sensing terminal 122 is higher than the voltage of the negative pole 110 of the secondary cell. Value of the multiplied resistance (Rsens) of the sensing resistor 121 by the charge and discharge current appears at the sensing terminal 122. By monitoring that value, the remaining capacity of the secondary cell can be monitored.

In the charge and discharge control circuit 102 of the present invention, one more additional sensing resistors 123 is connected in series between the sensing resistor 121 and the switch circuit 103. An FET 125 is connected to the sensing resistor 123 in parallel, and the gate voltage of the FET is applied from a control output terminal 126. At a high gate voltage of the FET (hereafter, ON state), both terminals of the sensing resistor 123 short because the ON resistance of the FET is very small (generally several mΩ to 30 mΩ). That is equivalent to the state in which the sensing resistor 123 is not connected. At a low gate voltage of the FET 125 (hereafter, OFF state), the FET becomes non-conductive between source and drain thereof, and the series resistance value between the sensing terminal 122 and the switch circuit 103 is equivalent to resistance value of the sensing resistor 123. That is, depending on the voltage of the control terminal 126, the series resistance value between the sensing resistor 121 and the switch circuit 103 is controlled.

In the charge and discharge control circuit 102, two operational amplifiers are provided. An input terminal of an operational amplifier 127 is connected to the sensing terminal 122 and, an input terminal of the other operational amplifier 129 is connected to the sensing terminal 124. The output of each of the operational amplifiers 127 and 129 is input to the control circuit 117.

According to output voltage of the operational amplifier 127, voltage of the control output terminal 126 varies. When the output voltage of the operational amplifier 127 is higher than the predetermined value (when load current of the load 109 is large), the FET 125 is placed in an ON state by outputting a HIGH voltage to the control output terminal 126 of the FET 125. When the output voltage of the operational amplifier 127 is lower than the predetermined value (when load current of the load 109 is small), the FET 125 is placed in an OFF state by outputting a LOW voltage to the control output terminal 126 of the FET 125. These operations are all controlled in the output control circuit 117.

Figure 4:
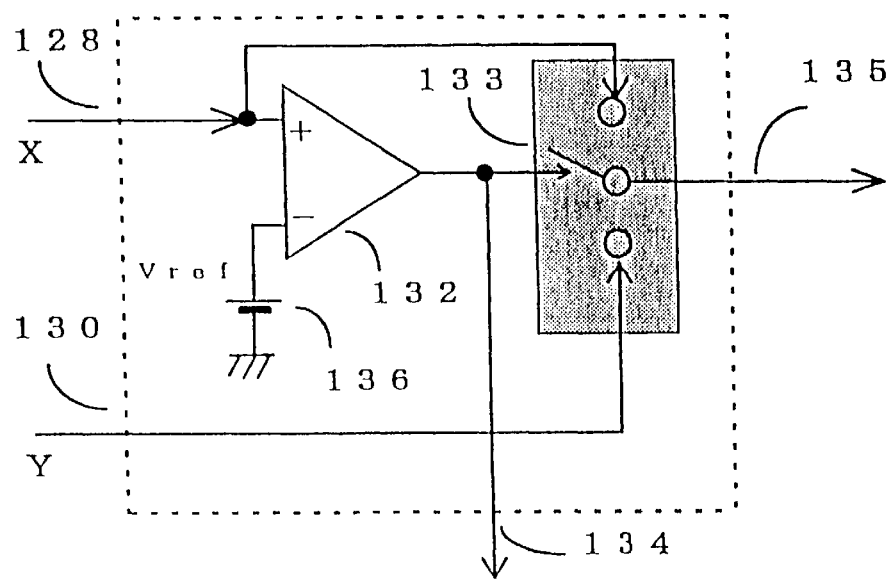
FIG. 4 is a circuit block diagram showing an example of an output control circuit of the chargeable power supply unit shown in FIG. 1.

FIG. 4 is a view showing a part of the output control circuit 117 of FIG. 1. Output voltages X and Y of the operational amplifiers 127 and 129 are respectively input. Output voltage X of the operational amplifier 127 is input to a comparator 132, and the input voltage (output voltage X) is compared with reference voltage Vref of a reference power supply 136. Because of that, when the output voltage X of the operational amplifier 127 is higher than reference voltage Vref, the output of the comparator 132 inverts. When the output of the comparator 132 is HIGH (output voltage X of the operational amplifier 127 is sufficiently high), an analog switch 133 operates so that an output terminal 128 of the operational amplifier 127 is connected to an analog switch output terminal 135. In contrast, when the output of the comparator 132 is LOW (output voltage X of the operational amplifier 127 is lower than reference voltage Vref), the analog switch operates so that the output terminal 130 of the operational amplifier 129 is connected to the analog switch output terminal 135.

A comparator output terminal 134 is connected to the control output terminal 126 of the FET in FIG. 1. When the comparator output terminal 134 is HIGH, the FET 125 is placed in an ON state, and when the comparator output terminal 134 becomes LOW, the FET is placed in an OFF state.

Assuming: gain (amplification factor) of the operational amplifier 127 is G1; resistance value of the sensing resistor 121 is Rsen1; reference voltage is Vref; and charge and discharge current is Isens1, output voltage Vouta of the operational amplifier 127 and inversion voltage Vdet of the comparator 132 are given in the equations (1) and (2) respectively.

$$Vouta = G1 \times Rsens1 \times Isens1 \qquad (1)$$

$$Vdet \text{ (inversion voltage}( = Vref = G1 \times Rsens1 \times Ichange \qquad (2)$$

Here Ichange is discharged current when comparator output inverts. By the equation (2), Ichange is obtained.

$$Ichange = (Vref)/(G1 \times Rsens1) \qquad (3)$$

If discharge current is more than value of the equation (3), the analog switch operates so as to take output of the operational amplifier 127 from the analog switch output terminal 135. Value of discharge current is determined by G1 and Rsens is Vref is made constant.

For example, assuming: G1=100; Resns1=50 mΩ; and Vref=1.0 V, Ichange equals 0.2 A. When Ichange becomes low, the FET 125 shown in FIG. 1 is placed in an OFF state, and the output of the operational amplifier 129 is sent to a charge and discharge current analog output terminal 131.

As gain of the operational amplifier 129 is G2, sensing resistance is Rsens1+Rsens2, and charge and discharge current is Isens1, output voltage of the operational amplifier 129 is expressed in the equation (4)

$$Voutb = g2 \times (Rsens1 + Rsens2) \times Isens1 \qquad (4)$$

Here when current is a certain constant current (Isens1), the switch changes, and at that time, (G1/G2) is calculated by equation (1) and equation (4) in order that Vouta is equal to Voutb.

$$(G1/G2) = 1 + (Rsens2/Rsens1) \qquad (5)$$

In short, by suitably selecting G1, G2, Rsens1, and Rsens2, the same output voltage is obtained even if the operational amplifier and the sensing resistor are switched. Processing amplifier output value is essential for the device using the present invention, and computation is very simple if the same voltage is obtained even when sensing resistance value varied like that described above during discharge. Relation of charge and discharge current and the analog switch 133 when the equation (5) is satisfied is shown in FIG. 7.

Figure 5:
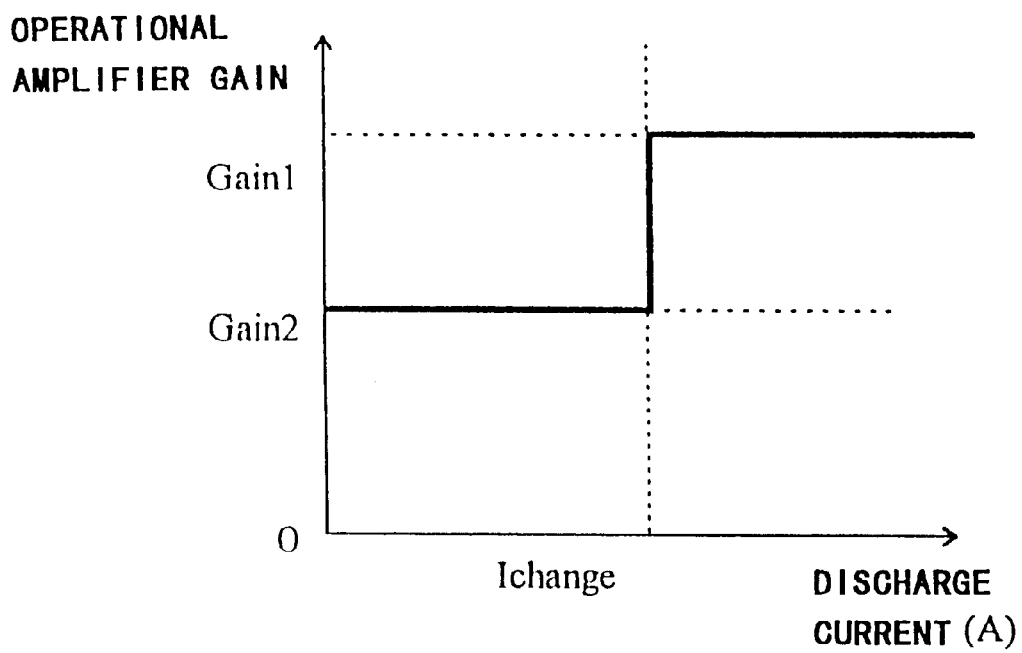
FIG. 5 is a relation view between charge and discharge current and amplification factor of the operational amplifier of the control circuit in the chargeable power supply unit shown in FIG. 1.
Figure 6:
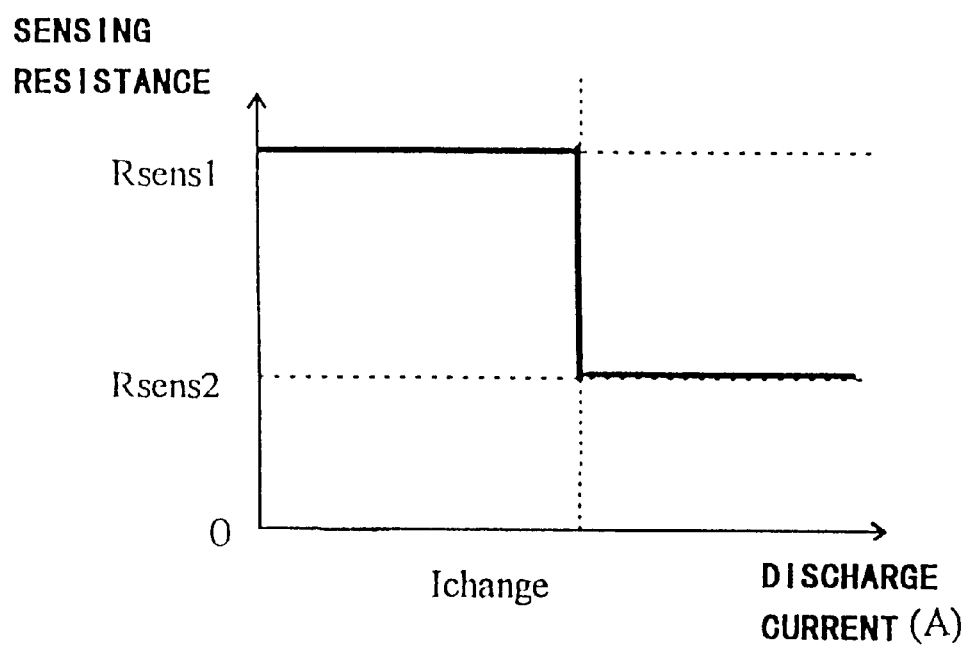
FIG. 6 is a relation view between charge and discharge current and sensing resistance value of the control circuit in the chargeable power supply unit shown in FIG. 1.

As noted in the above-mentioned circuit operation and the equation (5), it is obvious that G1 should be set smaller than G2. It causes a circuit in which gain is high when charge and discharge current is larger than Ichange and gain is low when charge and discharge current is smaller than Ichange to operate. With regard to the sensing resistor, opposite relation holds. That is, total sensing resistance becomes small when charge and discharge current is smaller than Ichange. These relations are shown in FIGS. 5 and 6.

In order to explain the effectiveness of the present embodiment, the state in which discharge current gradually increases will be described referring to FIG. 7. In order to avoid a complex description, the figure shows the case in which the cell voltage is less than over-charge detecting voltage, more than over-discharge detecting voltage, and it is possible to undergo normal charge and discharge. That is, in FIG. 1, gate voltages of the FETs 112 and 13 are always in a HIGH stat, and charge to the load 109 and discharge from the charger 108 are assured all the time.

Figure 7:
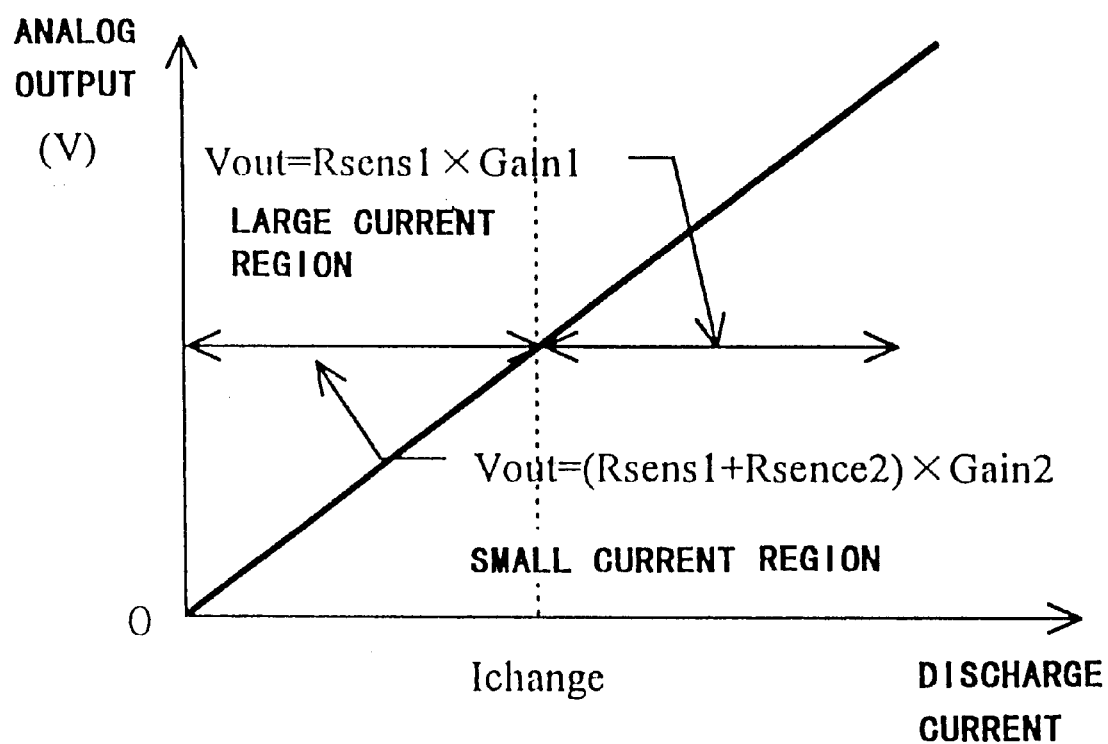
FIG. 7 is a relation view between charge and discharge current and analog output value of the control circuit in the chargeable power supply unit shown in FIG. 1.

As shown in FIG. 7, discharge current is small at initial state, output voltage shows the value expressed in the equation (4) because output of the operational amplifier 129 becomes effective (it can be taken from the charge and discharge current analog output terminal 131) at that time. Although a rather larger sensing resistance value is needed at this time, loss at the sensing resistor is very small because discharge current is small.

After that, discharge current increases, and when the discharge current reaches Ichange shown in FIG. 7, the output of the operational amplifier 127 becomes effective. Although the output voltage is expressed in equation (1), when sensing resistor and gain of the operational amplifier hold the relation of the equation (5), little variation is seen in voltage at the switched output. Although the discharge current increases after Ichange, the sensing resistance is a small value such as Rsens1, and loss at the sensing resistor is decreased.

Figure 8:
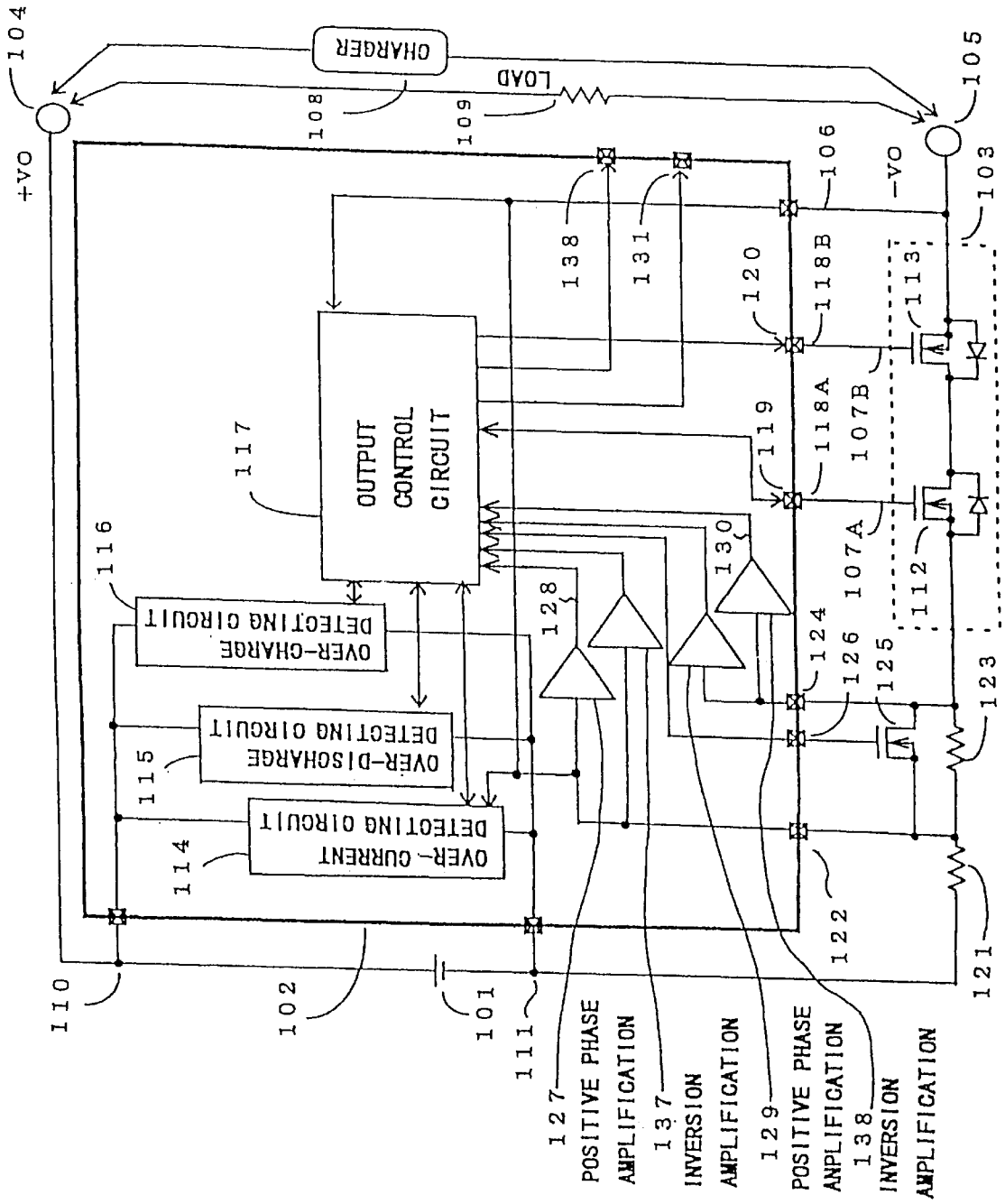
FIG. 8 is a circuit block diagram showing a second embodiment of a chargeable power supply unit of the present invention.

Although a circuit configuration for monitoring discharge current is illustrated in FIG. 1, a similar circuit may be provided for monitoring charge current. This is shown in FIG. 8 as a second embodiment of a chargeable power supply unit of the present invention. In the embodiment, an operational amplifier 138 connected to the sensing resistor 122 and an operational amplifier 137 connected to the sensing resistor 124 are added to the circuit shown in the embodiment of FIG. 1. Each operational amplifier output is input to the output control circuit 117. As operational amplifiers 137 and 138 are inversion amplifying type, output is amplified in positive voltage when voltage of the sensing terminals 122 and 124 becomes lower than negative pole of the secondary cell 101. These outputs are output in the similar circuit with the circuit shown in FIG. 4 in which the FET 125 is controlled. A signal can be taken from a charge and discharge current analog switch output terminal 139. Although voltages of the sensing terminals 122 and 124 are lower than negative pole 111 of the secondary cell 101 under the configuration when charge is carried out from the charger 108 to the secondary cell 101, a positive voltage signal proportional to charge current is obtained from the charge and discharge current analog switch output terminal 139 so as to be very easy to process signals.

Naturally, ON/OFF control may be carried out even if operational amplifiers 137 and 138 are changed to positive phase amplifiers. Although illustration is omitted, that is easily accommodated by change of the control circuit.

Figure 9:
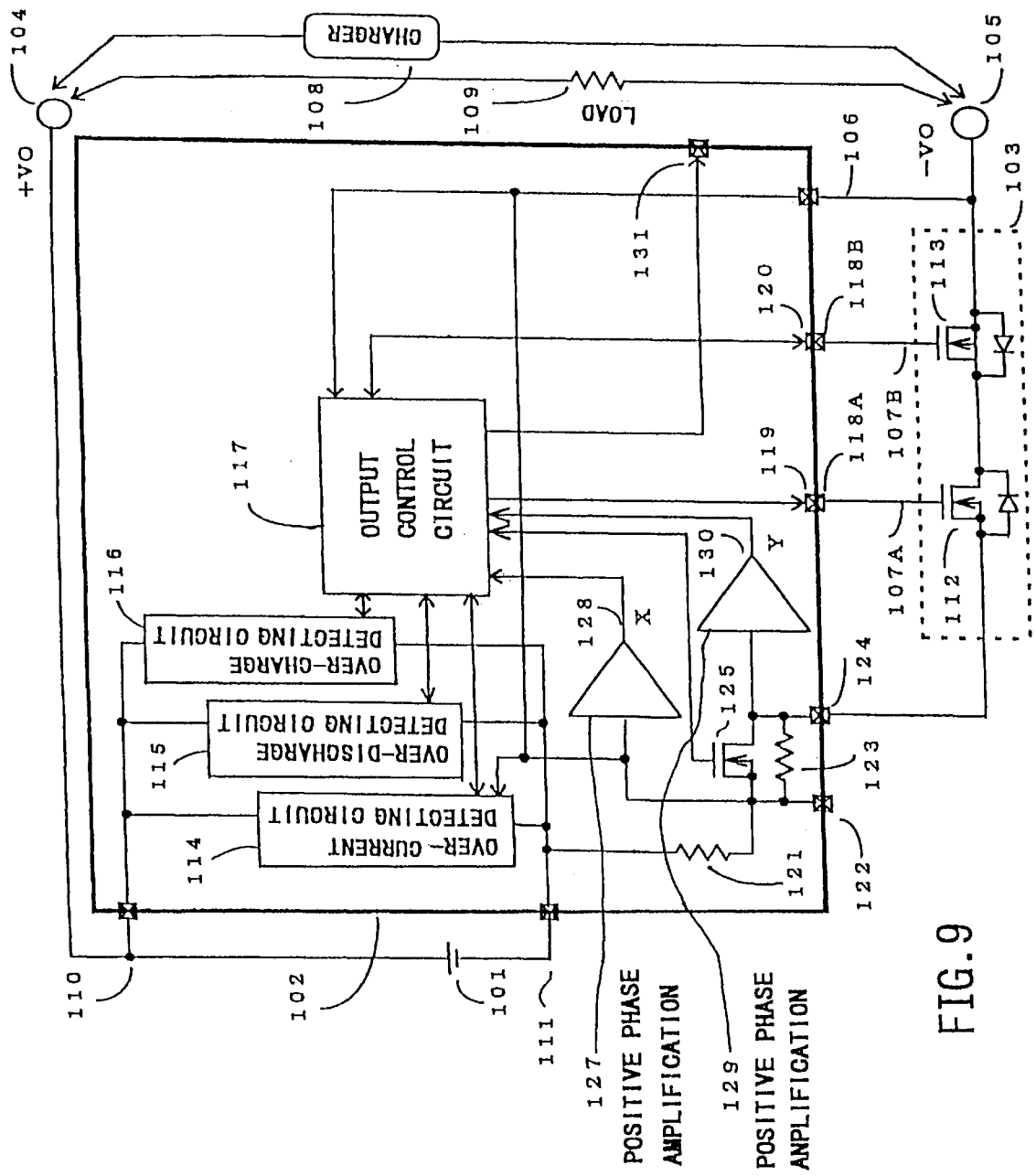
FIG. 9 is a circuit block diagram showing a third embodiment of a chargeable power supply unit of the present invention.

The above-mentioned sensing resistors 123, 124, FET 125 and so on may be included in the charge and discharge control circuit 102. That is shown in FIG. 9 as a third embodiment of the charge and discharge control circuit 102 of the present invention. In this embodiment, the above-mentioned parts are included in the charge and discharge control circuit 102. It is obvious that the same characteristics is shown even if some of these parts are connected to the external of the charge and discharge control circuit 102 without being including in the circuit.

Figure 10:
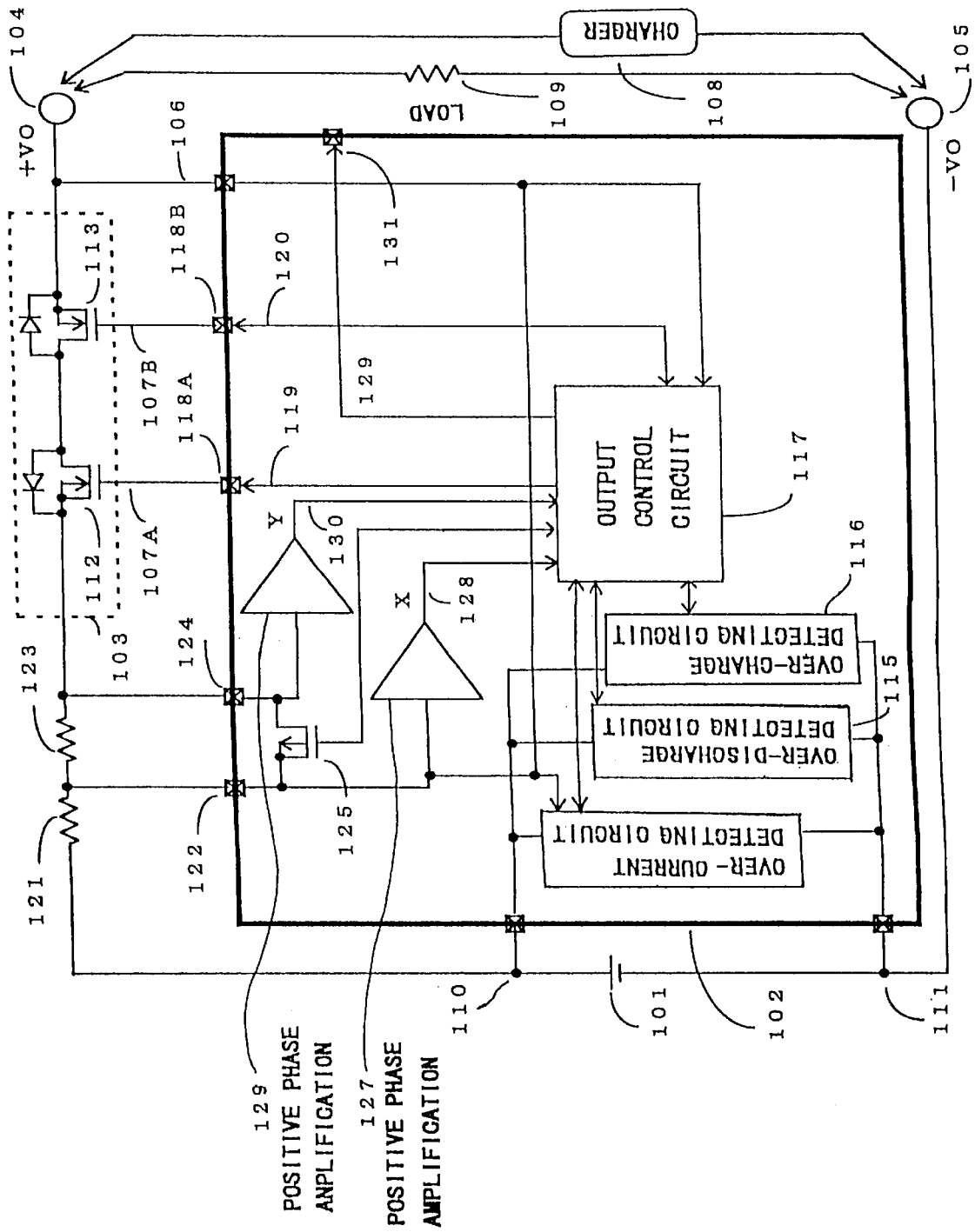
FIG. 10 is a circuit block diagram showing a fourth embodiment of a chargeable power supply unit of the present invention.

A circuit in which the switch circuit 103 shown in FIG. 1 comprises a Pch-FET is shown in FIG. 10 as a fourth embodiment of a chargeable power supply unit. In this case, the sensing resistor is connected to the positive pole 110 of the cell 101 in series, and the positions of the sensing terminals 122 and 124 are changed according to this. Although internal block of the output control circuit 117 and the like are changed from the embodiment of FIG. 1, it is obvious that the circuit operates absolutely similarly to the above-mentioned circuit.

Although it is described to control charge and discharge of one secondary cell in the above-mentioned embodiments, if change is carried out so that voltage of each cell can be detected in the charge and discharge control circuit 102 even when plural secondary cells are connected in series, the circuit can be easily constructed, and the present invention is efficient too at that time.

Although, in the present embodiment, the charge and discharge control circuit comprises C-MOS devices (Complementary Metal Oxide Semiconductor), it is possible to easily realize that the circuit comprises any devices such as bi-polar transistors.

Further, if the circuit switches the sensing resistor by the predetermined charge and discharge current, the present invention can realize the desired purpose. Therefore, it does not need to be absolutely the same circuit as in the disclosed embodiments.

As above-mentioned, the circuit of the present invention not only has loss at charge and discharge of the secondary cell and can convert accurately charge and discharge current to voltage without influence of offset voltage of the operational amplifier, but can increase safety of the secondary cell so as to solve the problem of the prior circuit.

By circuit configuration above-mentioned, the present invention can convert accurately charge and discharge current to voltage, dissolves problem of offset voltage while decreasing loss caused by the sensing resistor, and can protect the secondary cell from abnormal state such as over-charge, over-discharge, and over-current. Therefore, the present invention has advantages increasing reliability and safety of products.

What is claimed is:

1. A charge and discharge control circuit having a charge and discharge detecting function for controlling a switch circuit having a current detecting element connected to a secondary cell: wherein the current detecting element has an adjustable resistance which varies in accordance with the value of a current flowing therethrough, the current detecting element comprising a first resistor and a second resistor connected in series, and a switch element connected in parallel to the second resistor.

2. A charge and discharge control circuit having a charge and discharge current detecting function according to claim 1; further comprising an over-current detecting circuit for detecting whether a current through the secondary cell exceeds a predetermined current level, the over-current detecting circuit comprising a voltage detecting circuit for detecting a voltage at a selected terminal of the current detecting element.

3. A charge and discharge control circuit having a charge and discharge current detecting function according to claim 2; further comprising a positive phase amplifier and an inversion amplifier for detecting current at one terminal of the current detecting element.

4. A charge and discharge control circuit having a charge and discharge detecting function according to claim 1; further comprising an overcharge detecting circuit for detecting whether the secondary cell is in an overcharged state wherein the voltage of the secondary cell is above a first predetermined voltage, an overdischarge detecting circuit for detecting whether the secondary cell is in an overdischarged state wherein the voltage of the secondary cell is below a second predetermined voltage, an overcurrent detecting circuit for detecting whether the secondary cell is in an overcurrent state wherein a current through the secondary cell is above a predetermined current level, and an output control circuit for controlling the switch circuit to disconnect the secondary cell from an external connection terminal when the secondary cell is in one of an overcharged state, an overdischarged state and an overcurrent state.

5. A charge and discharge control circuit having a charge and discharge detecting function according to claim 4; wherein the overcurrent detecting circuit includes the current detecting element.

6. A charge and discharge control circuit having a charge and discharge detecting function according to claim 1; further comprising an overcurrent detecting circuit for detecting whether the secondary cell is in an overcurrent state wherein a current through the secondary cell is above a predetermined current level; and an output control circuit for controlling the switch circuit to disconnect the secondary cell from an external connection terminal when the secondary cell is in an overcurrent state.

7. A charge and discharge control circuit having a charge and discharge detecting function according to claim 6; further comprising a first amplifier for amplifying a voltage at one terminal of the first resistor to detect a voltage drop across the first resistor and a second amplifier for amplifying a voltage at one terminal of the second resistor to detect a voltage drop across the first and second resistors; wherein the output control circuit controls the switch element so that a current flows through the first resistor and not the second resistor when the switch element is closed and flows through the first and second resistors when the switch element is open.

8. A charge and discharge control circuit having a charge and discharge detecting function according to claim 6; wherein the output control circuit comprises a comparator circuit for comparing an output of the first amplifier with a reference voltage and producing an output signal in accordance with the comparison result for controlling the switch element to open when the output of the first amplifier is lower than the reference voltage.

9. A charge and discharge control circuit according to claim 6; further comprising an output control circuit for controlling the switch circuit to disconnect the secondary cell from an external connection terminal, and for controlling the switch element so that a current flows through the first resistor and not the second resistor when the switch element is closed and flows through the first and second resistors when the switch element is open.

10. A charge and discharge control circuit according to claim 9; wherein the first and second resistors and the first and second amplifiers satisfy the relationship G1/G2=1+ (Rsens2/Rsens1), wherein G1 is the gain of the first amplifier, G2 is the gain of the second amplifier, Rsens1 is the resistance value of the first resistor and Rsens2 is the resistance value of the second resistor.

11. A charge and discharge control circuit having a charge and discharge detecting function according to claim 1; further comprising a first amplifier for amplifying a voltage at one terminal of the first resistor and a second amplifier for amplifying a voltage at one terminal of the second resistor.

12. A chargeable power supply unit having a charge and discharge current detecting function, comprising: a switch circuit connected to an external power supply terminal in parallel; a current detecting element connected in series to the switch circuit and to the secondary cell; and a charge and discharge control circuit connected to the secondary cell in parallel for controlling the switch circuit; wherein the current detecting element has an adjustable resistance which varies in accordance with the value of a current flowing therethrough, the current detecting element comprising a first resistor and a second resistor connected in series, and a switch connected in parallel to the second resistor.

13. A chargeable power supply unit having a charge and discharge current detecting function according to claim 12; further comprising an over-current detecting circuit for detecting whether a current through the secondary cell exceeds a predetermined current level, the over-current detecting circuit comprising a voltage detecting circuit for detecting a voltage at a selected terminal of the current detecting element.

14. A chargeable power supply unit having a charge and discharge current detecting function according to claim 13; further comprising a positive phase amplifier and an inversion amplifier for detecting current at one terminal of the current detecting element.

15. A chargeable power supply unit comprising: a charge and discharge control circuit for detecting a charge and discharge state of a secondary cell and controlling the charging and discharging of the secondary cell in accordance with the detected state; a switch circuit connected to the secondary cell; and a current detecting element connected to the secondary cell, the current detecting element having an adjustable resistance value which is varied in accordance with the value of a current flowing therethrough, the current detecting element comprising a first resistor and a second resistor connected in series, and a switch element connected in parallel to the second resistance.

16. A chargeable power supply unit according to claim 15; wherein the charge and discharge control circuit comprises an overcharge detecting circuit for detecting whether the secondary cell is in an overcharged state wherein the voltage of the secondary cell is above a first predetermined voltage, an overdischarge detecting circuit for detecting whether the secondary cell is in an overdischarged state wherein the voltage of the secondary cell is below a second predetermined voltage, an overcurrent detecting circuit for detecting whether the secondary cell is in an overcurrent state wherein a current through the secondary cell is above a predetermined current level, and an output control circuit for controlling the switch circuit to disconnect the secondary cell from an external connection terminal when the secondary cell is in one of an overcharged state, an overdischarged state and an overcurrent state.

17. A chargeable power supply unit according to claim 15; wherein the overcurrent detecting circuit includes the current detecting element.

18. A chargeable power supply unit according to claim 15; further comprising a first amplifier for amplifying a voltage at one terminal of the first resistor and a second amplifier for amplifying a voltage at one terminal of the second resistor.

19. A chargeable power supply unit according to claim 18; further comprising an output control circuit for controlling the switch circuit to disconnect the secondary cell from an external connection terminal, and for controlling the switch element so that a current flows through the first resistor and not the second resistor when the switch element is closed and flows through the first and second resistors when the switch element is open.

20. A charge and discharge control circuit according to claim 19; wherein the first and second resistors and the first and second amplifiers satisfy the relationship G1/G2=1+ (Rsens2/Rsens1), wherein G1 is the gain of the first amplifier, G2 is the gain of the second amplifier, Rsens1 is the resistance value of the first resistor and Rsens2 is the resistance value of the second resistor.

* * * * *